(12) United States Patent
Amano

(10) Patent No.: US 9,168,915 B2
(45) Date of Patent: Oct. 27, 2015

(54) VEHICLE AND METHOD FOR CONTROLLING VEHICLE

(75) Inventor: Takashi Amano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 14/355,049

(22) PCT Filed: Nov. 4, 2011

(86) PCT No.: PCT/JP2011/075406
§ 371 (c)(1),
(2), (4) Date: Apr. 29, 2014

(87) PCT Pub. No.: WO2013/065167
PCT Pub. Date: May 10, 2013

(65) Prior Publication Data
US 2014/0316626 A1    Oct. 23, 2014

(51) Int. Cl.
| | |
|---|---|
| B60L 11/00 | (2006.01) |
| B60W 20/00 | (2006.01) |
| B60K 6/445 | (2007.10) |
| B60W 10/08 | (2006.01) |
| B60L 11/12 | (2006.01) |
| B60L 11/14 | (2006.01) |
| B60L 15/20 | (2006.01) |

(52) U.S. Cl.
CPC .............. *B60W 20/104* (2013.01); *B60K 6/445* (2013.01); *B60L 11/123* (2013.01); *B60L 11/14* (2013.01); *B60L 15/20* (2013.01); *B60W 10/08* (2013.01); *B60W 20/00* (2013.01); *B60L 2210/10* (2013.01); *B60L 2210/40* (2013.01); *B60W 2550/142* (2013.01); *B60W 2710/086* (2013.01); *Y02T 10/6217* (2013.01); *Y02T 10/6239* (2013.01); *Y02T 10/7077* (2013.01); *Y02T 10/7216* (2013.01); *Y02T 10/7241* (2013.01); *Y02T 10/7258* (2013.01)

(58) Field of Classification Search
None
See application file for complete search history.

(56) References Cited

U.S. PATENT DOCUMENTS

| | | | | |
|---|---|---|---|---|
| 6,053,842 | A * | 4/2000 | Kitada et al. | 477/5 |
| 2006/0102398 | A1 | 5/2006 | Mizuno | |
| 2009/0146615 | A1 | 6/2009 | Zillmer et al. | |
| 2011/0035135 | A1* | 2/2011 | Schwalm et al. | 701/110 |
| 2011/0276216 | A1* | 11/2011 | Vaughan | 701/29 |
| 2012/0123624 | A1 | 5/2012 | Sato et al. | |

FOREIGN PATENT DOCUMENTS

| | | |
|---|---|---|
| JP | A-9-242579 | 9/1997 |
| JP | A-2004-127747 | 4/2004 |
| JP | A-2007-187090 | 7/2007 |

(Continued)

*Primary Examiner* — Thomas Tarcza
*Assistant Examiner* — Garrett Evans
(74) *Attorney, Agent, or Firm* — Oliff PLC

(57) ABSTRACT

A vehicle includes: a motor generator for generating driving power for traveling thereof; an ECU for controlling the motor generator; and an inclination detecting unit for detecting inclination of a road surface. The ECU performs power changing driving in which the vehicle is traveled while switching the motor generator between a first state (high output state) and a second state (low output state). In the first state (high output state), driving power of a first level is generated. In the second state (low output state), the driving power is made smaller than that in the first state. When it is recognized that the vehicle is traveling on an uphill road based on the inclination detected by the inclination detecting unit, ECU sets the driving power in the first state to be larger than that set when the vehicle is traveling on a flat road.

16 Claims, 13 Drawing Sheets

(56) References Cited

FOREIGN PATENT DOCUMENTS

| | | |
|---|---|---|
| JP | A-2008-520485 | 6/2008 |
| JP | A-2009-298232 | 12/2009 |
| JP | A-2010-6309 | 1/2010 |
| JP | A-2011-11648 | 1/2011 |
| JP | A-2011-46272 | 3/2011 |
| JP | A-2012-110089 | 6/2012 |
| WO | WO 2006/053624 A1 | 5/2006 |

* cited by examiner

VEHICLE AND METHOD FOR CONTROLLING VEHICLE

TECHNICAL FIELD

The present invention relates to a vehicle and a method for controlling the vehicle, more particularly, control for traveling of a vehicle that travels using inertia force of the vehicle.

BACKGROUND ART

In recent years, as an environmentally friendly vehicle, a vehicle has been drawing attention which has a power storage device (such as a secondary battery or a capacitor) and which travels using driving power generated from electric power stored in the power storage device. Examples of such a vehicle include an electric vehicle, a hybrid vehicle, a fuel cell vehicle, and the like.

In order to further reduce environmental load, these vehicles are required to reduce fuel consumption and electric power consumption so as to improve energy efficiency.

Japanese National Patent Publication No. 2008-520485 (PTL 1) discloses a hybrid vehicle including an internal combustion engine and a motor generator, wherein the motor generator is controlled such that a first interval and a second interval are alternately repeated while the motor generator is in a power generator mode. In the first interval, the motor generator is driven to output high power larger than actual electric power consumption of an electric system of the vehicle. In the second interval, the motor generator is switched off.

According to Japanese National Patent Publication No. 2008-520485 (PTL 1), while the motor generator operates as a power generator, the motor generator is driven at an operating point of high efficiency in the first interval, and the motor generator is stopped in the second interval. In this way, the motor generator is suppressed from being continuously driven in a state of low efficiency during the power generation operation, thereby improving energy efficiency of the vehicle during the power generation operation.

Meanwhile, Japanese Patent Laying-Open No. 2010-6309 (PTL 2) discloses a hybrid vehicle including an internal combustion engine and a motor generator, wherein traveling using driving power generated by the internal combustion engine and traveling in an inertia state with the internal combustion engine being stopped are alternately repeated. In this way, the internal combustion engine can be driven at an operating point of high efficiency, thereby achieving improved fuel consumption.

CITATION LIST

Patent Literature

PTL 1: Japanese National Patent Publication No. 2008-520485
PTL 2: Japanese Patent Laying-Open No. 2010-6309
PTL 3: Japanese Patent Laying-Open No. 2009-298232
PTL 4: Japanese Patent Laying-Open No. 2007-187090

SUMMARY OF INVENTION

Technical Problem

Japanese National Patent Publication No. 2008-520485 (PTL 1) described above presents the configuration in which driving and stopping of the motor generator are repeated when performing electric power generation using the motor generator. In Japanese National Patent Publication No. 2008-520485 (PTL 1), driving power for traveling of the vehicle is not changed.

Meanwhile, Japanese Patent Laying-Open No. 2010-6309 (PTL 2) discloses the hybrid vehicle in which the acceleration/inertia traveling control is performed by repeating driving and stopping of an engine, which is the internal combustion engine. In Japanese Patent Laying-Open No. 2010-6309 (PTL 2), driving of the motor generator is not taken into consideration.

When inclination of a road surface is changed during the acceleration/inertia traveling of the vehicle in Japanese Patent Laying-Open No. 2010-6309 (PTL 2), acceleration/deceleration of the vehicle is influenced by gravity acting on the vehicle. Accordingly, in order to maintain the vehicle speed, it is necessary to control an output of the driving source in accordance with the change in inclination of the road surface. Japanese Patent Laying-Open No. 2010-6309 (PTL 2) does not describe specific control in the case where there is a change in inclination of the road surface on which the vehicle travels.

The present invention has been made to solve such a problem, and has its object to appropriately improve energy efficiency in consideration of a change in inclination of a road surface during traveling of a vehicle capable of traveling using driving power from an engine and/or a motor generator.

Solution to Problem

A vehicle according to the present invention includes: a driving source for generating driving power for traveling of the vehicle; a control device for controlling the driving source; and an inclination detecting unit for detecting inclination of a road surface. The control device performs power changing driving in which the vehicle is traveled while switching the driving source between a first state and a second state, driving power of a first level being generated in the first state, driving power in the second state being made smaller than that in the first state. When it is recognized that the vehicle is traveling on an uphill road based on the inclination detected by the inclination detecting unit, the control device sets the driving power in the first state to be larger than that set when the vehicle is traveling on a flat road.

Preferably, the control device performs the power changing driving when a change of user's requested driving power falls within a predetermined range.

Preferably, when the power changing driving is being performed, the control device switches between the first and second states to maintain speed of the vehicle in a permitted range.

Preferably, the control device switches to the first state in response to the speed of the vehicle being decreased to a lower limit value of the permitted range, and switches to the second state in response to the speed of the vehicle being increased to an upper limit value of the permitted range.

Preferably, when the vehicle is traveling on the uphill road, the control device sets the upper limit value to be lower than that set when the vehicle is traveling on the flat road.

Preferably, when the vehicle is traveling on the uphill road, the control device sets the driving power in the second state to be larger than that set when the vehicle is traveling on the flat road.

Preferably, the control device sets the driving power in the first state to be larger as a degree of the inclination is larger in a direction of traveling on the uphill road.

Preferably, the driving power in the first state is set to be larger than constant reference driving power that is capable of maintaining speed of the vehicle. The driving power in the second state is set to be smaller than the reference driving power.

Preferably, in the second state, the control device stops generation of the driving power from the driving source.

Preferably, in the second state, the vehicle travels mainly using inertia force of the vehicle.

Preferably, the vehicle further includes another driving source for generating the driving power for traveling of the vehicle. The control device performs power changing driving in which the another driving source is switched between a third state and a fourth state, driving power of a second level being generated in the third state, driving power smaller than that in the third state being generated in the fourth state.

Preferably, when the driving source is in the first state, the control device brings the another driving source into the third state, and when the driving source is in the second state, the control device brings the another driving source into the fourth state.

Preferably, when the vehicle is traveling on the uphill road, the control device sets the driving power of the another driving source in the third state to be larger than that set when the vehicle is traveling on the flat road.

Preferably, a total of the driving power of the driving source in the first state and the driving power of the another driving source in the third state is set to be larger than constant reference driving power that is capable of maintaining speed of the vehicle. A total of the driving power of the driving source in the second state and the driving power of the another driving source in the fourth state is set to be smaller than the reference driving power.

Preferably, one of the driving source and the another driving source is a rotating electrical machine, and the other of the driving source and the another driving source is an engine.

Preferably, both the driving source and the another driving source are rotating electrical machines.

Preferably, the driving source is one of a rotating electrical machine and an engine.

A method for controlling a vehicle in the present invention is a method for controlling a vehicle having a driving source for generating driving power for traveling thereof and an inclination detecting unit for detecting inclination of a road surface. The method includes the steps of: bringing the driving source into a first state in which driving power of a predetermined level is generated; bringing the driving source into a second state in which the driving power is made smaller than that in the first state; performing power changing driving in which the vehicle is traveled while switching between the first and second states; and when it is recognized that the vehicle is traveling on an uphill road based on the inclination detected by the inclination detecting unit, setting the driving power in the first state to be larger than that set when the vehicle is traveling on a flat road.

Advantageous Effects of Invention

According to the present invention, energy efficiency can be appropriately improved in consideration of a change in inclination of a road surface during traveling of a vehicle capable of traveling using driving power from an engine and/or a motor generator.

DESCRIPTION OF EMBODIMENTS

Figure 1:
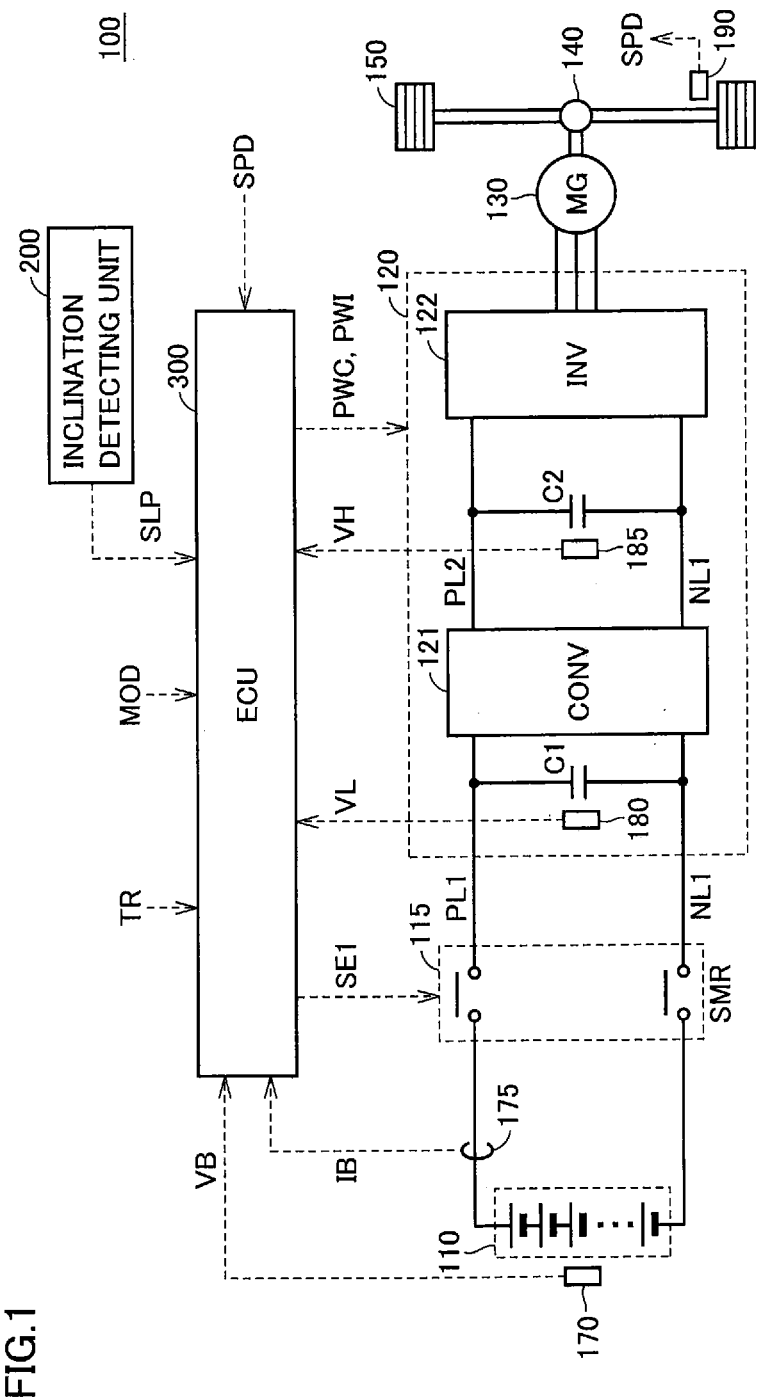
FIG. 1 is an overall block diagram of a vehicle according to a first embodiment.

The following describes embodiments of the present invention in detail with reference to figures. It should be noted that the same or corresponding portions in the figures are given the same reference characters and are not described repeatedly.

[First Embodiment]

FIG. 1 is an overall block diagram of a vehicle 100 according to a first embodiment of the present invention. As described in detail below, vehicle 100 is an electric vehicle or a fuel cell vehicle, which employs a rotating electrical machine as a driving source.

Referring to FIG. 1, vehicle 100 includes: a power storage device 110; a system main relay (SMR) 115; a PCU (Power Control Unit) 120 serving as a driving device; a motor generator 130; a power transmission gear 140; driving wheels 150; an inclination detecting unit 200; and an ECU (Electronic Control Unit) 300 serving as a control device. PCU 120 includes a converter 121, an inverter 122, voltage sensors 180, 185, and capacitors C1, C2.

Power storage device 110 is a power storage component configured to be chargeable/dischargeable. Power storage device 110 is configured to include a secondary battery such as a lithium ion battery, a nickel-hydrogen battery, or a lead storage battery, or include a storage element such as an electric double layer capacitor, for example.

Power storage device 110 is connected to PCU 120 via power lines PL1 and NL1. Power storage device 110 supplies electric power to PCU 120 so as to generate driving power of vehicle 100. Further, power storage device 110 stores electric power generated by motor generator 130. Power storage device 110 has an output of, for example, approximately 200 V.

Power storage device 110 is provided with a voltage sensor 170 and a current sensor 175. Voltage sensor 170 detects a voltage VB of power storage device 110, and sends a detection result thereof to ECU 300. Current sensor 175 detects a current IB sent/received to/from the power storage device, and sends a detection value thereof to ECU 300.

SMR 115 includes relays, each of which has one end connected to the positive electrode terminal or negative electrode terminal of power storage device 110, and has the other end connected to power line PL1, NL1 connected to PCU 120. Further, SMR 115 makes switching to supply or cut off electric power between power storage device 110 and PCU 120, based on a control signal SE1 sent from ECU 300.

Converter 121 performs voltage conversion between each of power lines PL1, NL1 and each of power lines PL2, NL1, based on a control signal PWC sent from ECU 300.

Inverter 122 is connected to power lines PL2, NL1. Based on a control signal PWI sent from ECU 300, inverter 122 converts direct-current power, which is supplied from converter 121, into alternating-current power so as to drive motor generator 130.

Capacitor C1 is provided between power lines PL1 and NL1, and reduces voltage fluctuation between power lines PL1 and NL1. Further, capacitor C2 is provided between power lines PL2 and NL1, and reduces voltage fluctuation between power lines PL2 and NL1.

Voltage sensor 180 detects a voltage VL applied across capacitor C1 and sends a detection value thereof to ECU 300. Voltage sensor 185 detects a voltage VH applied across capacitor C2, and sends a detection value thereof to ECU 300.

Motor generator 130 is an alternating-current rotating electrical machine, such as a permanent-magnet type synchronous motor including a rotor having a permanent magnet embedded therein.

Output torque from motor generator 130 is transmitted to driving wheels 150 via power transmission gear 140, which is configured to include a speed reducer and a power split device. In this way, vehicle 100 travels. Motor generator 130 is capable of generating electric power using rotation of driving wheels 150 when vehicle 100 operates for regenerative braking. The electric power thus generated is converted by PCU 120 into charging power for power storage device 110.

In order to detect speed of vehicle 100 (vehicle speed), a speed sensor 190 is provided adjacent to driving wheel 150. Speed sensor 190 detects vehicle speed SPD based on rotational speed of driving wheel 150, and sends a detection value thereof to ECU 300. Further, as the speed sensor, there may be employed a rotational angle sensor (not shown) for detecting rotation angle of motor generator 130. In this case, ECU 300 indirectly calculates vehicle speed SPD based on a change of rotation angle of motor generator 130 with time as well as a deceleration ratio.

Inclination detecting unit 200 detects inclination of a road surface on which vehicle 100 is traveling. Then, inclination detecting unit 200 sends a detection value SLP of the detected inclination to ECU 300. As inclination detecting unit 200, an inclination sensor, a G sensor, or the like can be used, for example.

Although not shown in FIG. 1, ECU 300 includes a CPU (Central Processing Unit), a memory device, and an input/output buffer, so as to receive signals from sensors, send control signals to devices, and control devices in power storage device 110 and vehicle 100. It should be noted that processing for these controls is not limited to software processing, and can be implemented by dedicated hardware (electronic circuit).

ECU 300 generates and sends control signals for controlling PCU 120, SMR 115, and the like. It should be noted that in FIG. 1, one control device is provided as ECU 300, but individual control devices may be respectively provided based on functions or devices to be controlled, such as a control device for PCU 120 and a control device for power storage device 110.

ECU 300 calculates a SOC (State of Charge) of power storage device 110 based on the detection values of voltage VB and current IB from voltage sensor 170 and current sensor 175 provided in power storage device 110.

From an upper-level ECU (not shown), ECU 300 receives a requested torque TR set based on a user's operation on an accelerator pedal (not shown). Based on the user's requested torque TR, ECU 300 generates respective control signals PWC, PWI for converter 121 and inverter 122 so as to drive motor generator 130.

Further, ECU 300 receives a mode signal MOD set by the user. This mode signal MOD is a signal indicating whether to perform inertia traveling control described below. Mode signal MOD is switched by a specific switch, settings on an operation screen, or the like. Alternatively, mode signal MOD may be automatically set in response to establishment of a specific condition.

For example, when mode signal MOD is set at ON, ECU 300 operates to perform the inertia traveling control. On the other hand, when mode signal MOD is set at OFF, ECU 300 operates to perform normal traveling in which the inertia traveling control is not performed.

In such a vehicle, electric power of the power storage device is consumed when driving power is generated from motor generator 130. The capacity of power storage device 110 is determined in advance. Hence, in order to travel a distance as long as possible using electric power stored in the power storage device, it is necessary to improve energy efficiency during traveling and suppress power consumption.

During traveling of the vehicle, inertia force acts on the vehicle. Hence, when driving power generated by the motor generator during traveling is made lower than driving power required to maintain the vehicle speed, the vehicle speed is gradually decreased but the traveling continues for a while using the inertia force of the vehicle (hereinafter, this traveling is also referred to as "inertia traveling").

During this inertia traveling, the driving power output by the motor generator is small to result in small consumption of electric power from the power storage device. Hence, if such inertia traveling can be utilized in traveling, energy efficiency during vehicle traveling can be improved.

In view of this, in the first embodiment, improvement of energy efficiency during traveling is achieved in the following manner. That is, in the vehicle shown in FIG. 1, when the vehicle is traveling while the user's requested torque is substantially constant and accordingly the vehicle speed is maintained to be substantially constant, the inertia traveling control is performed to implement driving in which acceleration traveling and inertia traveling are repeatedly performed (hereinafter, also referred to as "power changing driving"). In the acceleration traveling, high driving power is output from the motor generator. In the inertia traveling, low driving power (inclusive of a case where driving power is zero) is output from the motor generator.

In such inertia traveling control, the user's request torque is substantially constant as described above. However, for example, when vehicle 100 is moved from a flat road to an uphill, the vehicle speed is decreased due to influence of gravity even though the user's request torque is constant. As a result, the vehicle speed cannot be presumably maintained within a predetermined permitted range, or sufficient acceleration torque cannot be presumably obtained to result in a long period of time of the acceleration traveling. In addition, when a change in inclination is so gradual that the user does not notice that he/she is traveling on an uphill road, decrease of the vehicle speed causes slowdown of vehicles coming thereafter. This presumably leads to traffic jam.

Hence, in the first embodiment, in addition to implementing the inertia traveling control employing the power changing driving of the motor generator, when the road surface is changed from a flat road to an uphill road, driving power for the acceleration traveling is controlled to be larger than the driving power for the traveling on flat road.

It should be noted that the expression "driving power is controlled to be larger" is intended to include a case where the absolute value of the driving power is made larger and a case where a total of driving powers output while performing the acceleration traveling is made larger. In other words, the above expression is intended to include a case where a period of time of generating driving power is made longer even though the absolute value of the driving power is the same as that for the traveling on flat road.

Figure 2:
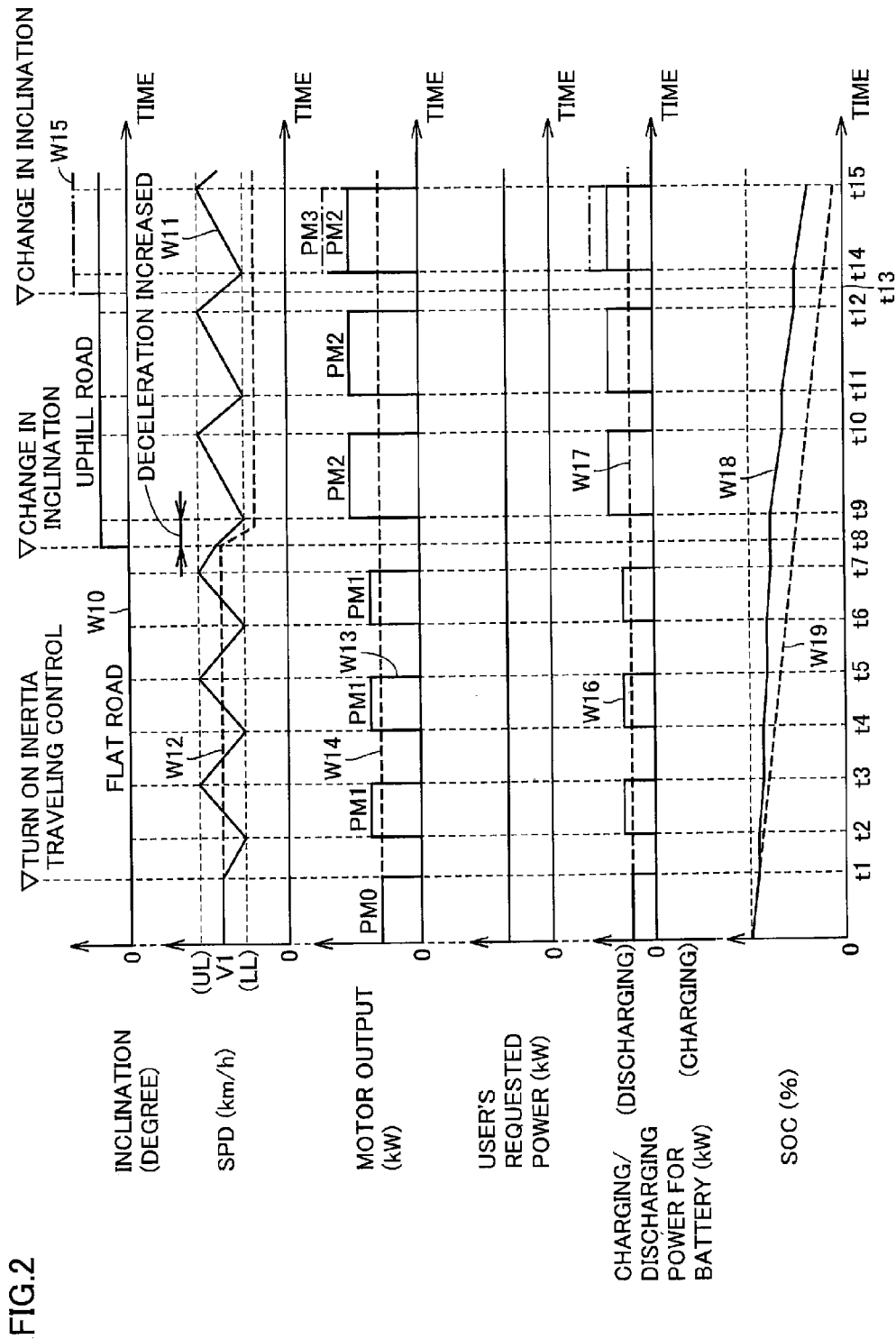
FIG. 2 is a time chart for illustrating gist of inertia traveling control in the first embodiment.

FIG. 2 is a time chart for illustrating gist of the inertia traveling control in the first embodiment. In FIG. 2, the horizontal axis represents time. The vertical axis represents inclination of the road surface, vehicle speed SPD, output of the motor generator, the user's requested power, charging/discharging power for the power storage device (battery), and the SOC of the power storage device. Regarding the charging/discharging power for the power storage device, the discharging power is indicated by a positive value and the charging power is indicated by a negative value.

Referring to FIG. 1 and FIG. 2, first, it is assumed that vehicle 100 is traveling on a flat road at a constant vehicle speed V1 (a period of time to t8). In this case, as shown in FIG. 2, the user's requested power is given as a substantially constant value. It should be noted that the expression "the user's requested power is given as a substantially constant value" is intended to indicate a state in which the user's requested power is slightly fluctuated but is maintained to fall within a predetermined range (for example, ±3%) during a predetermined period of time.

When the inertia traveling control in the first embodiment is not applied, the output of motor generator 130 is substantially constant in magnitude in a continuous manner as indicated by a broken line W14 in FIG. 2. Accordingly, vehicle speed SPD is maintained to be substantially constant as indicated by a broken line W12 in FIG. 2.

On this occasion, constant electric power is continuously output from power storage device 110 as indicated by a broken line W17 in FIG. 2. Accordingly, the SOC of power storage device 110 is linearly decreased as indicated by a broken line W19 in FIG. 2.

When vehicle 100 reaches an uphill (uphill road) involving a change in inclination of the road surface at time t8, gravity acting on vehicle 100 has an influence to substantially reduce driving power acting in the vehicle traveling direction, thus resulting in increased deceleration. Accordingly, the vehicle speed is decreased as indicated by broken line W12 in FIG. 2, with the result that the vehicle speed cannot be presumably maintained in the permitted range. When vehicle 100 is brought into such a state in a heavy traffic condition, vehicles coming after vehicle 100 accordingly have to reduce speed unless the driver of vehicle 100 notices the decrease of the vehicle speed. This presumably results in traffic jam or results in collision if a vehicle coming after vehicle 100 does not notice the decrease of the vehicle speed of vehicle 100.

Meanwhile, in the case where the inertia traveling control in the first embodiment is applied, the acceleration traveling with motor generator 130 being driven and the inertia traveling with motor generator 130 being stopped are basically alternately repeated.

Specifically, until time t1, the inertia traveling control in the first embodiment is not applied, and a motor output PM0 is continuously output.

When the user instructs at time t1 to perform the inertia traveling control, motor generator 130 is first stopped (a solid line W13 in FIG. 2). Accordingly, no driving power is supplied from motor generator 130, with the result that vehicle speed SPD is gradually decreased from the start of the traveling using inertia force as indicated by a solid line W11 in FIG. 2.

On this occasion, the charging/discharging power from power storage device 110 becomes zero, thereby suppressing decrease of the SOC.

Then, when vehicle speed SPD is decreased to a lower limit value LL of a predetermined permitted range set relative to a target vehicle speed V1 (at time t2 in FIG. 2), driving of motor generator 130 is resumed. Motor output on this occasion is set at PM1, which is larger than output PM0 required to maintain vehicle speed V1. Accordingly, vehicle 100 is accelerated. On this occasion, although an amount of decrease of the SOC becomes larger during generation of the driving power than that in the case where no inertia traveling is performed, electric power has not been consumed in the inertia traveling during the period of time t1 to t2. Accordingly, the total SOC is maintained to be high (a solid line W18 in FIG. 2).

Then, when vehicle speed SPD is increased to an upper limit value UL of the above-described predetermined permitted range, motor generator 130 is stopped again (at time t3 in FIG. 2), thereby performing the inertia traveling.

Thereafter, similarly when vehicle speed SPD is decreased to lower limit value LL, motor generator 130 is driven. Then, when vehicle speed SPD is increased to upper limit value UL, motor generator 130 is stopped.

By performing such power changing driving, although vehicle speed SPD is fluctuated in the above-described permitted range, the average speed can be maintained substantially at V1, while suppressing decrease of the SOC of the power storage device. As a result, energy efficiency is improved as a whole, thereby achieving traveling in a longer distance using electric power stored in the power storage device.

Then, when vehicle 100 is traveled to reach an uphill involving a change in inclination of the road surface at time t8, the driving power of motor generator 130 in the acceleration traveling is increased to PM2 (>PM1) in response to the change in inclination. Thus, acceleration torque opposing the gravity can be obtained by increasing the driving power of motor generator 130, with the result that decrease of the vehicle speed can be suppressed.

It should be noted that the motor output of the motor generator in the acceleration traveling, and the acceleration time can be appropriately set. For example, the acceleration time may be set at a predetermined period of time, and the motor output may be set such that vehicle speed SPD can be increased from lower limit value LL to upper limit value UL during the period of time thus set. Alternatively, the motor output for the acceleration may be set at a predetermined output and the acceleration time may be determined depending on a situation during the traveling. If the acceleration time is too short, large power is required to presumably result in torque shock. On the other hand, if the motor output is too small, the acceleration time, i.e., the driving time of the motor generator becomes long, with the result that the inertia traveling is less likely to be performed. Hence, the acceleration time and the motor output for the acceleration are set appropriately in consideration of driveability and energy efficiency.

Further, the motor output for traveling on uphill may be set to attain the same acceleration as the acceleration attained during traveling on flat road, or may be set such that a total of the time of the acceleration traveling and the time of the inertia traveling while traveling on the flat road is the same as a total of the time of the acceleration traveling and the time of the inertia traveling while traveling on the uphill, for example. Further, the motor output is desirably changed in accordance with a degree of inclination. For example, in the case where the inclination of the uphill is further increased as indicated by a chain line W15 in FIG. 2, the motor output may be correspondingly increased to PM3 (>PM2).

In FIG. 2, it has been illustrated that the inclination is changed stepwisely, but in the case where the inclination is continuously increased, the motor output may be correspondingly increased in a continuous manner.

In the inertia traveling control of the first embodiment, as described above, the power changing driving shown in FIG. 2 is performed when the user's requested power is substantially constant. Meanwhile, during acceleration and deceleration in which the user's requested power is fluctuated, the power changing driving is not performed. During the acceleration in which the user's requested power is increased, driving power is continuously output from motor generator 130 so as to accelerate the vehicle. On the other hand, during the deceleration in which the user's requested power is decreased, driving power from motor generator 130 is stopped or decreased to reduce the speed to a desired vehicle speed.

Figure 3:
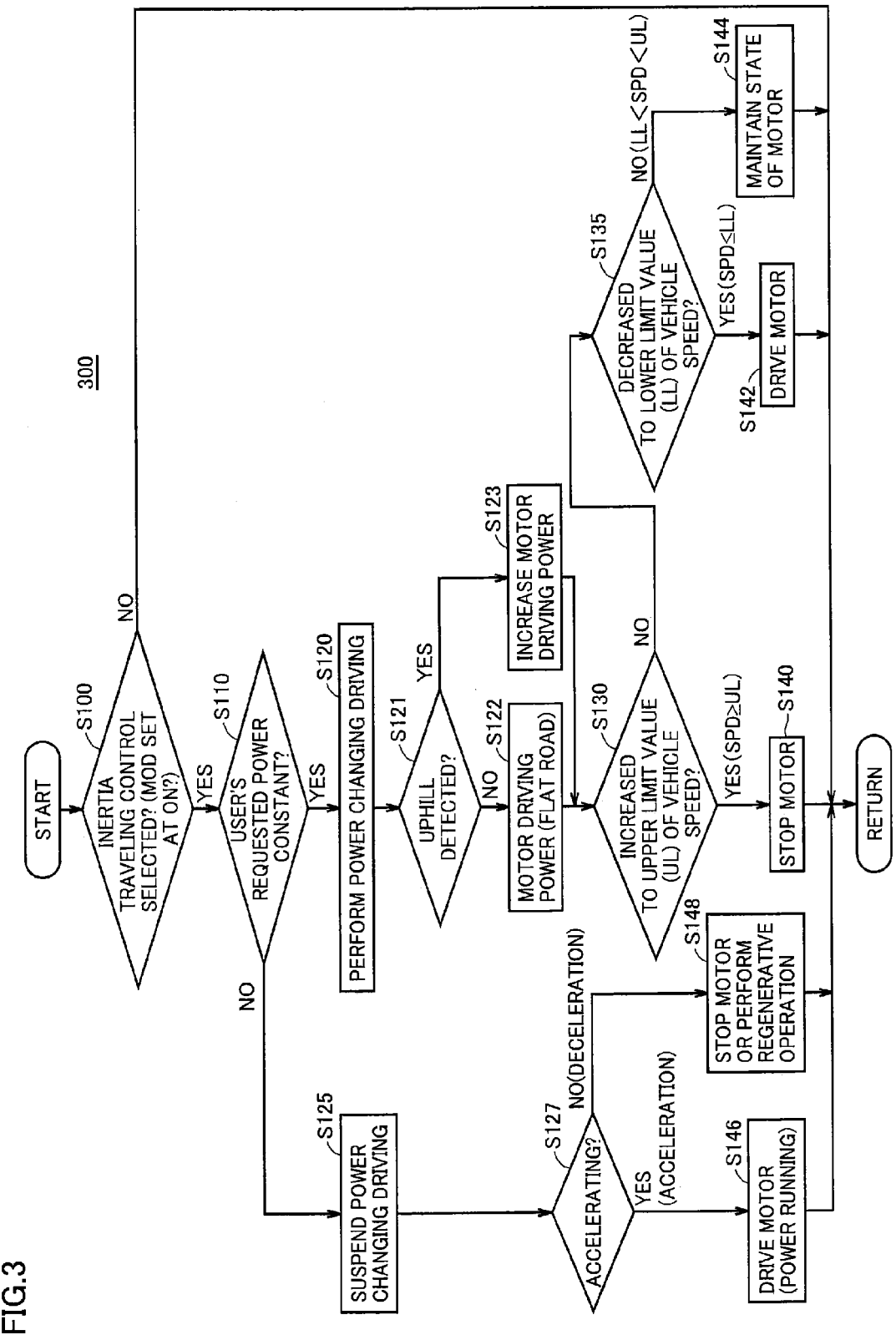
FIG. 3 is a flowchart for illustrating an inertia traveling control process performed by an ECU in the first embodiment.

FIG. 3 is a flowchart for illustrating an inertia traveling control process performed by ECU 300 in the first embodiment. Each of steps in flowcharts shown in FIG. 3 as well as FIG. 5, FIG. 7, FIG. 9, and FIG. 12 described below is implemented by executing a program, stored in advance in ECU 300, at a predetermined cycle. Alternatively, a part of the steps can be implemented by dedicated hardware (electronic circuit) constructed for the processing.

Referring to FIG. 1 and FIG. 3, in a step (hereinafter, the word "step" will be abbreviated as "S") 100, ECU 300 determines whether or not the inertia traveling control is selected, based on mode signal MOD set by the user.

When mode signal MOD is set at OFF and the inertia traveling control is not selected (NO in S100), processes after this are skipped and ECU 300 returns the process to a main routine.

When mode signal MOD is set at ON and the inertia traveling control is selected (YES in S100), the process proceeds to S110. In S110, ECU 300 then determines whether or not the user's requested power is substantially constant, based on requested torque TR.

When the user's requested power is substantially constant (YES in S110), the process proceeds to S120. In S120, ECU 300 makes selection to perform the power changing driving. It should be noted that although not shown in FIG. 3, motor generator 130 is first stopped and the inertia traveling is performed just after the start of the power changing driving as shown in FIG. 2.

Next, based on signal SLP from inclination detecting unit 200, ECU 300 determines in S121 whether or not an uphill has been detected.

When the uphill has not been detected (NO in S121), the process proceeds to S122. In S122, ECU 300 sets the driving power for traveling on flat road, as the motor driving power in the acceleration traveling. Thereafter, the process proceeds to S130.

Meanwhile, when the uphill has been detected (YES in S121), the process proceeds to S123. In S123, in accordance with inclination thereof, ECU 300 sets the driving power to be increased as compared with that in the case of flat road, as the motor driving power in the acceleration traveling. Then, the process proceeds to S130.

Then, ECU 300 determines in S130 whether or not vehicle speed SPD has been increased to upper limit value UL of the permitted speed range.

As described above, motor generator 130 is first stopped and the inertia traveling is performed just after the start of the power changing driving. Hence, vehicle speed SPD is lower than upper limit value UL, and vehicle speed SPD is gradually decreased.

In other words, because vehicle speed SPD has not been increased to upper limit value UL of the permitted speed range (NO in S130), the process proceeds to S135. In S135, ECU 300 then determines whether or not vehicle speed SPD has been decreased to lower limit value LL of the permitted speed range.

In the case where vehicle speed SPD is being decreased within the permitted speed range (LL<SPD<UL), i.e., in the case where vehicle speed SPD has not been decreased to lower limit value LL of the permitted speed range (NO in S135), the process proceeds to S144. In S144, ECU 300 maintains the present state of motor generator 130 and continues the inertia traveling. Thereafter, the process is returned to the main routine, and the process is performed again from S100 in the next control cycle.

In the case where vehicle speed SPD is decreased to lower limit value LL of the permitted speed range (SPD≤LL) while the inertia traveling is continued (YES in S135), the process proceeds to S142. In S142, ECU 300 drives motor generator 130 using the driving power set in S122 or S123, thereby performing acceleration traveling. Accordingly, vehicle speed SPD is increased.

While the vehicle speed is being increased within the permitted speed range by performing this acceleration traveling, NO is selected in S130 and S135. Accordingly, ECU 300 continues the acceleration traveling until vehicle speed SPD reaches upper limit value UL of the permitted speed range in S144.

It should be noted that when the vehicle re-enters a flat road from the uphill while performing the acceleration traveling, the motor driving power is brought back to the driving power for flat road in S121 and S122.

Then, when vehicle speed SPD is increased to upper limit value UL of the permitted speed range (YES in S130), the process proceeds to S140. In S140, ECU 300 stops motor generator 130 and performs the inertia traveling.

While the user's requested power is maintained to be substantially constant, the above-described power changing driving is performed to maintain vehicle speed SPD in the permitted speed range.

Meanwhile, when the user's requested power is fluctuated for acceleration or deceleration (NO in S110), the process proceeds to S125. In S125, ECU 300 suspends the power changing driving.

When instructed to accelerate by means of the user's requested power (YES in S127), ECU 300 drives motor generator 130 in a power running state to accelerate vehicle 100 (S146).

Meanwhile, when the user has instructed to decelerate (NO in S127), the process proceeds to S148. In S148, ECU 300 performs deceleration by means of the inertia traveling with motor generator 130 being stopped (S148). Alternatively, in the case where more prompt deceleration is required, ECU 300 performs deceleration involving regenerative braking with motor generator 130 being driven in a regenerative state. Alternatively, the deceleration may be performed by switching between the deceleration employing the inertia traveling and the deceleration involving the regenerative braking.

Thereafter, when the user's acceleration or deceleration operation is ended and the user's requested power becomes substantially constant (YES in S110), the power changing driving is resumed.

By performing the control in accordance with the process described above, the power changing driving, in which the inertia traveling and the acceleration traveling are repeatedly performed, can be performed when the user's requested power is substantially constant. When traveling on an uphill involving a change in inclination of the road surface, the driving power of the motor generator is increased in accordance with increase of the inclination. In this way, the vehicle speed can be suppressed from being decreased on the uphill due to influence of gravity, while improving energy efficiency during the vehicle traveling.

[Second Embodiment]

In the first embodiment, it has been illustrated that in the inertia traveling control, the driving power of the motor generator in the acceleration traveling is controlled to be increased when the road surface is changed from the flat road to the uphill.

As described above, after passing through the uphill and re-entering the flat road, the motor driving power is reverted to the setting for flat road. For example, when re-entering a flat road just before the vehicle speed reaches the upper limit value of the permitted range during the acceleration traveling, the motor driving power is reduced to the value for flat road. However, acceleration resulting from the driving power increased until re-entering the flat road causes increase of the vehicle speed just after re-entering the flat road. Accordingly, the vehicle speed exceeds the permitted range to presumably make the driver feel that the vehicle is dashing out (feeling of abrupt acceleration).

To address this, in the second embodiment, when the vehicle travels on an uphill, the inertia traveling control is performed to control the upper limit value of the permitted range of the vehicle speed to be decreased as compared with the upper limit value in the case of traveling on a flat road. By performing such control, the vehicle speed can be maintained within the permitted range while preventing the driver from feeling that the vehicle is dashing out when re-entering a flat road from an uphill.

Figure 4:
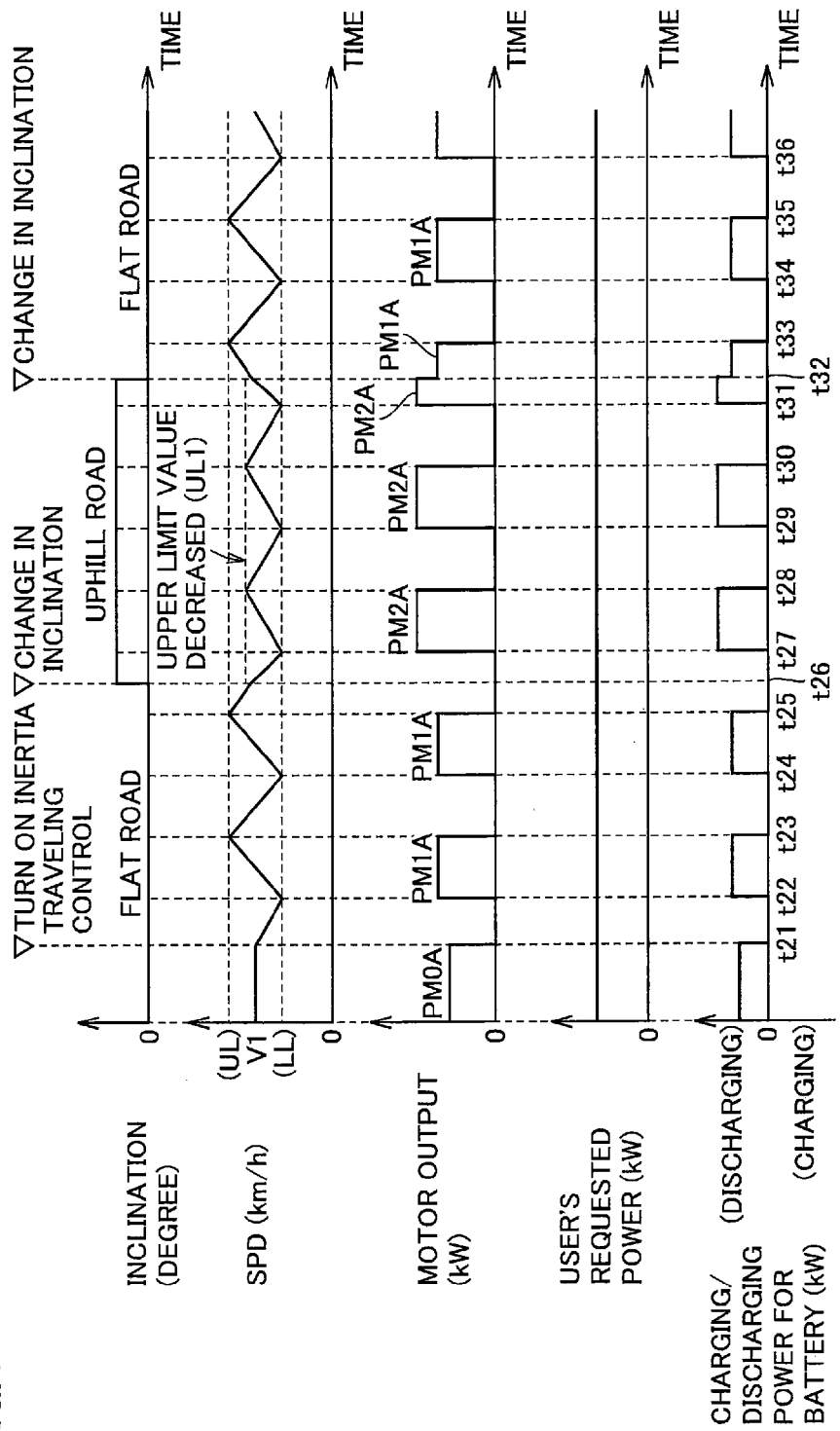
FIG. 4 is a time chart for illustrating gist of inertia traveling control in a second embodiment.

FIG. 4 illustrates gist of the inertia traveling control in the second embodiment. In FIG. 4, the horizontal axis represents time. The vertical axis represents inclination of the road surface, vehicle speed SPD, output of the motor generator, the user's requested power, and charging/discharging power for the power storage device.

Referring to FIG. 4, as with the description of the first embodiment, when it is recognized that the vehicle is traveling on an uphill while performing the inertia traveling control (time t26 in FIG. 4), the motor driving power in the acceleration traveling is increased from PM1A to PM2A (a period of time t26 to t32 in FIG. 4).

Further, in the second embodiment, while the vehicle is traveling on the uphill (the period of time t26 to t32), upper limit value UL of the permitted range of the vehicle speed is decreased from UL0, which is the upper limit value for flat road, to UL1 (<UL0). During the period of time t26 to t32, the inertia traveling control is performed such that vehicle speed SPD falls within the range defined by lower limit value LL and upper limit value UL1.

When re-entering a flat road from the uphill (time t32 in FIG. 4), the motor driving power is decreased to PM1A, which is the motor driving power for flat road, and upper limit value UL of the permitted range of the vehicle speed is reverted from UL1 to UL0. In this way, even if the vehicle speed is overshot just after re-entering the flat road from the uphill, the vehicle speed can be suppressed from exceeding upper limit value UL0 for flat road in the permitted range.

It should be noted that although not shown in FIG. 4, while traveling on the uphill, lower limit value LL may be increased in addition to decreasing upper limit value UL of the permitted range of the vehicle speed.

Figure 5:
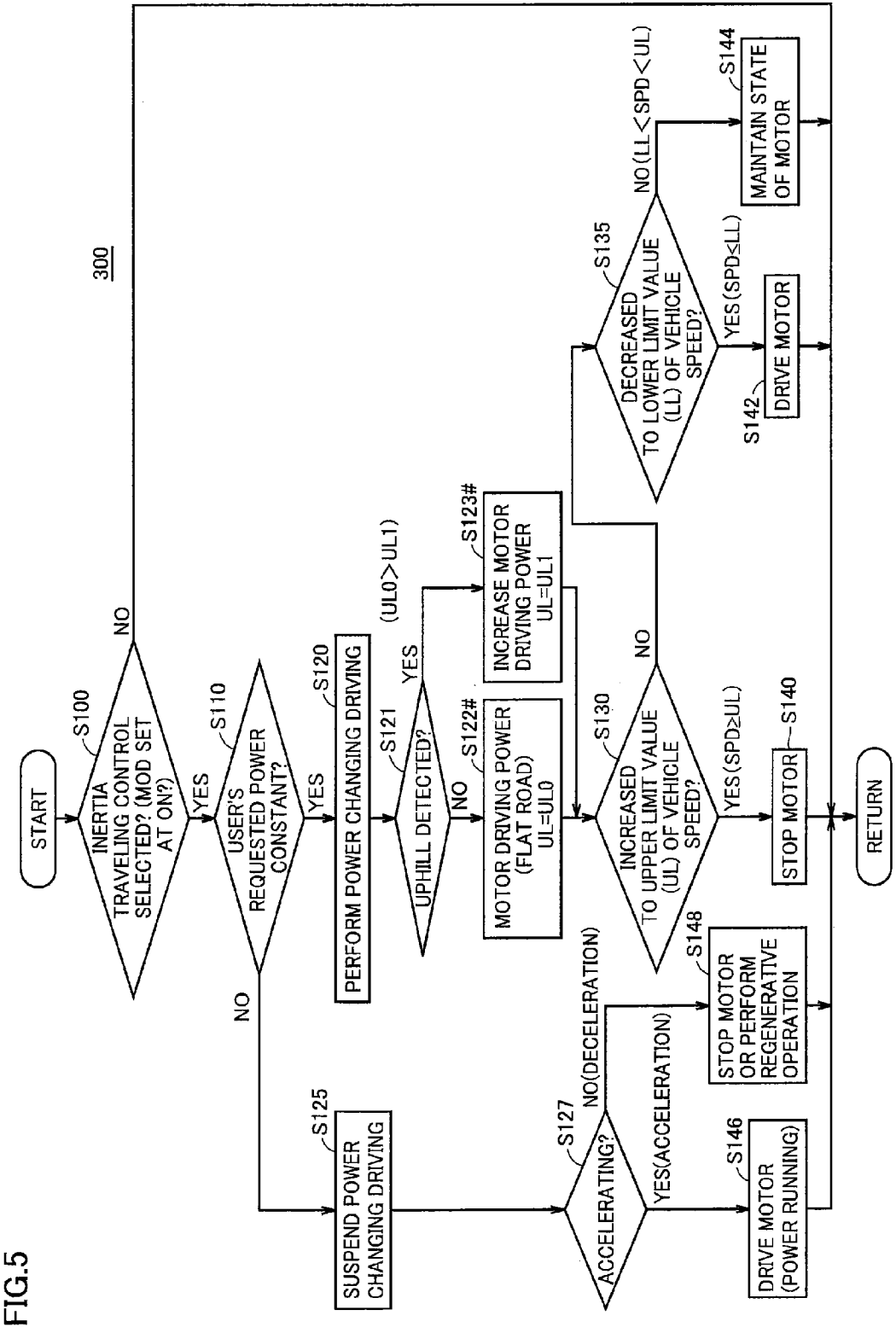
FIG. 5 is a flowchart for illustrating an inertia traveling control process performed by an ECU in the second embodiment.

FIG. 5 is a flowchart for illustrating an inertia traveling control process performed by ECU 300 in the second embodiment. FIG. 5 is a figure in which steps S122, S123 in the flowchart of FIG. 3 of the first embodiment are respectively replaced with S122#, S123#. In FIG. 5, the same steps as those in FIG. 3 are not described repeatedly.

Referring to FIG. 1 and FIG. 5, when the user's requested power is constant (YES in S110) and the power changing driving is performed (S120), ECU 300 determines in S121 whether or not an uphill has been detected, based on signal SLP sent from inclination detecting unit 200.

When the uphill has not been detected (NO in S121), the process proceeds to S122#. In S122#, ECU 300 sets the driving power for flat road as the motor driving power in the acceleration traveling, and sets upper limit value UL of the permitted range of the vehicle speed at UL0. Then, the process proceeds to S130.

Meanwhile, when the uphill has been detected (YES in S121), the process proceeds to S123#. In S123#, in accordance with inclination thereof, ECU 300 sets the driving power to be increased as compared with that in the case of the flat road, as the motor driving power in the acceleration traveling, and sets the upper limit value UL of the permitted range of the vehicle speed at UL1 (<UL0), which is lower than the upper value for flat road. Then, the process proceeds to S130.

Then, when the vehicle speed is decreased to lower limit value LL (NO in S130 and YES in S135), ECU 300 performs the acceleration traveling using the driving power set in S122# or S123# (S142).

In the acceleration traveling, when the vehicle speed is increased to upper limit value UL set in S122# or S123# (YES in S130), ECU 300 stops motor generator 130 and performs the inertia traveling (S140).

When the vehicle speed is between lower limit value LL and upper limit value UL (NO in S135), ECU 300 maintains the present state of the motor in S144 and continues the acceleration traveling or the inertia traveling.

By performing the control in accordance with the process described above, the inertia traveling control taking the uphill into consideration can be performed to improve energy efficiency, while improving driveability by suppressing the driver from feeling that the vehicle is dashing out by abrupt increase of the vehicle speed when re-entering the flat road from the uphill.

[Third Embodiment]

As described above, when the road surface is changed from the flat road to the uphill, the deceleration is increased due to the gravity acting on the vehicle. In the case where the motor driving power for uphill in the acceleration traveling is increased as compared with the motor driving power for flat road in the inertia traveling control as in the first embodiment, decrease of acceleration, which is caused by the gravity, in the acceleration traveling can be complemented by appropriately adjusting the motor driving power. However, in the inertia traveling in which the motor generator is stopped, the increased deceleration cannot be complemented. Accordingly, when switching between the acceleration traveling and the inertia traveling, torque shock presumably becomes large. Moreover, a period of the inertia traveling becomes short, with the result that timing of switching between the acceleration traveling and the inertia traveling is fluctuated to presumably generate vibration.

To address this, in the third embodiment, in the inertia traveling control, the motor generator is controlled to be driven to output low driving power while performing the inertia traveling when traveling on the uphill, so as to complement the deceleration increased due to the influence of the gravity acting thereon.

Figure 6:
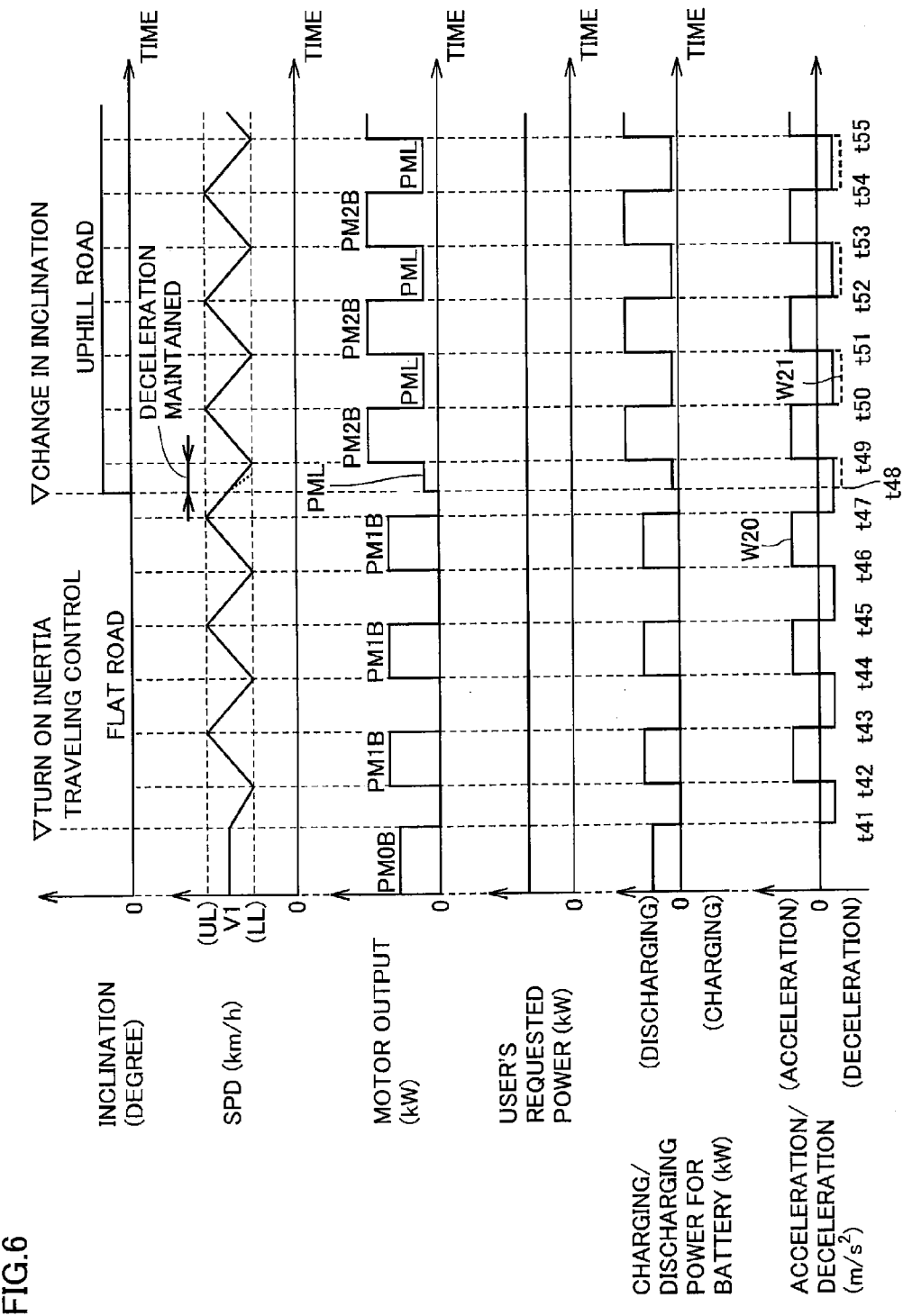
FIG. 6 is a time chart for illustrating gist of inertia traveling control in a third embodiment.

FIG. 6 is a time chart for illustrating gist of the inertia traveling control in the third embodiment. In FIG. 6, the horizontal axis represents time. The vertical axis represents inclination of the road surface, vehicle speed SPD, output of the motor generator, the user's requested power, charging/discharging power for the power storage device, and acceleration/deceleration. Regarding the acceleration/deceleration, the acceleration is represented by a positive value and the deceleration is represented by a negative value.

Referring to FIG. 6, when traveling on a flat road, the user instructs at time t41 to perform the inertia traveling control so as to repeatedly perform the acceleration traveling with the motor generator being driven and the inertia traveling with the motor generator being stopped. In this state, when an uphill is detected (time t48), the driving power in the acceleration traveling is increased from PM1B to PM2B (>PM1B).

Further, in the third embodiment, when traveling on the uphill while performing the inertia traveling, the motor generator is driven to provide low driving power PML. Motor driving power PML on this occasion is set based on driving power that can complement the influence of gravity when traveling on the uphill. Ideally, force provided by motor driving power PML is desirably equal to the decelerating force provided by the gravity, but the force provided by motor driving power PML may slightly differ from the decelerating force provided by the gravity as long as motor driving power PML falls within a range by which torque shock generated by switching between the acceleration traveling and the inertia traveling can be suppressed in a predetermined permitted range.

In this way, as shown in the bottom of FIG. 6, the deceleration is prevented from being increased in the inertia traveling when traveling on the uphill (a broken line W21 in FIG. 6), whereby the deceleration on flat road and the deceleration on uphill can become substantially equal to each other (a solid line W20 in FIG. 6). Further, by setting the motor driving power such that the acceleration on uphill and the acceleration on flat road become substantially equivalent to each other, the driver can feel that he/she drives more smoothly throughout the flat road and the uphill, thereby improving driveability.

Figure 7:
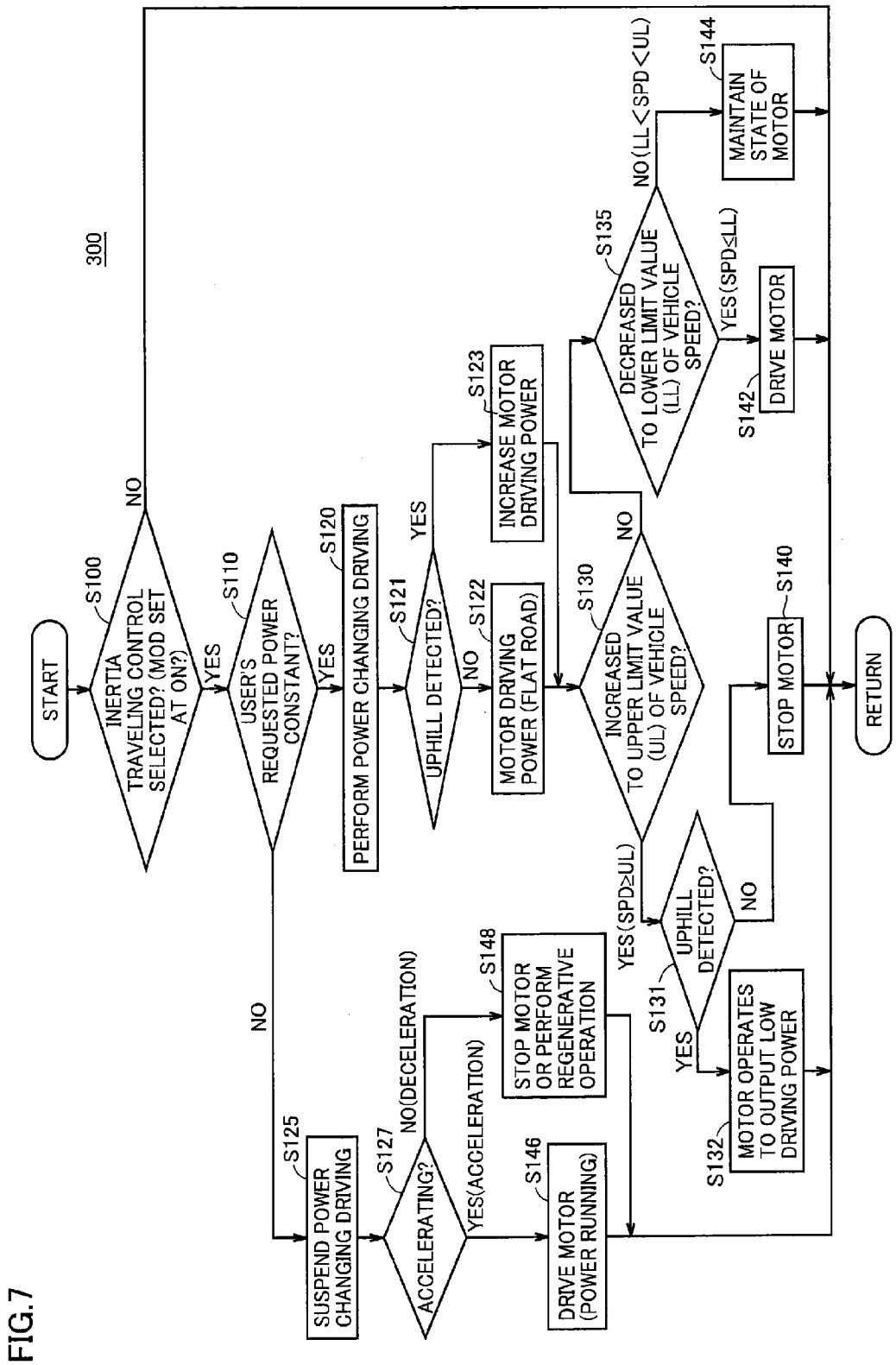
FIG. 7 is a flowchart for illustrating an inertia traveling control process performed by an ECU in the third embodiment.

FIG. 7 is a flowchart for illustrating an inertia traveling control process performed by ECU 300 in the third embodiment. FIG. 7 is a flowchart in which steps S131, S132 are further added to the flowchart of FIG. 3 of the first embodiment. In FIG. 7, the same steps as those in FIG. 3 are not described repeatedly.

Referring to FIG. 1 and FIG. 7, when the user's requested power is constant (YES in S110) and the power changing driving is performed (S120), ECU 300 sets the driving power in the acceleration traveling in accordance with the inclination (S121 to S123).

Then, when the vehicle speed is decreased to lower limit value LL of the permitted range (YES in S135), the acceleration traveling is performed using the driving power set in accordance with the inclination.

Thereafter, when the vehicle speed is increased to upper limit value UL of the permitted range while the acceleration traveling is continued (YES in S130), the process proceeds to S131. In S131, ECU 300 determines whether or not the vehicle is traveling on an uphill at present.

When the vehicle is not traveling on the uphill (NO in S131), ECU 300 stops motor generator 130 and performs the inertia driving (S140).

On the other hand, when the vehicle is traveling on the uphill (YES in S131), the process proceeds to S132. In S132, ECU 300 performs the inertia traveling while driving motor generator 130 to output low driving power sufficient to compensate the influence of the gravity acting on the vehicle.

By performing the control in accordance with the process described above, the inertia traveling control taking the uphill into consideration can be performed to improve energy efficiency, while improving driveability by easing the deceleration of the vehicle during the inertia traveling on the uphill.

It should be noted that the configuration of the second embodiment can be applied also to the third embodiment.

Figure 8:
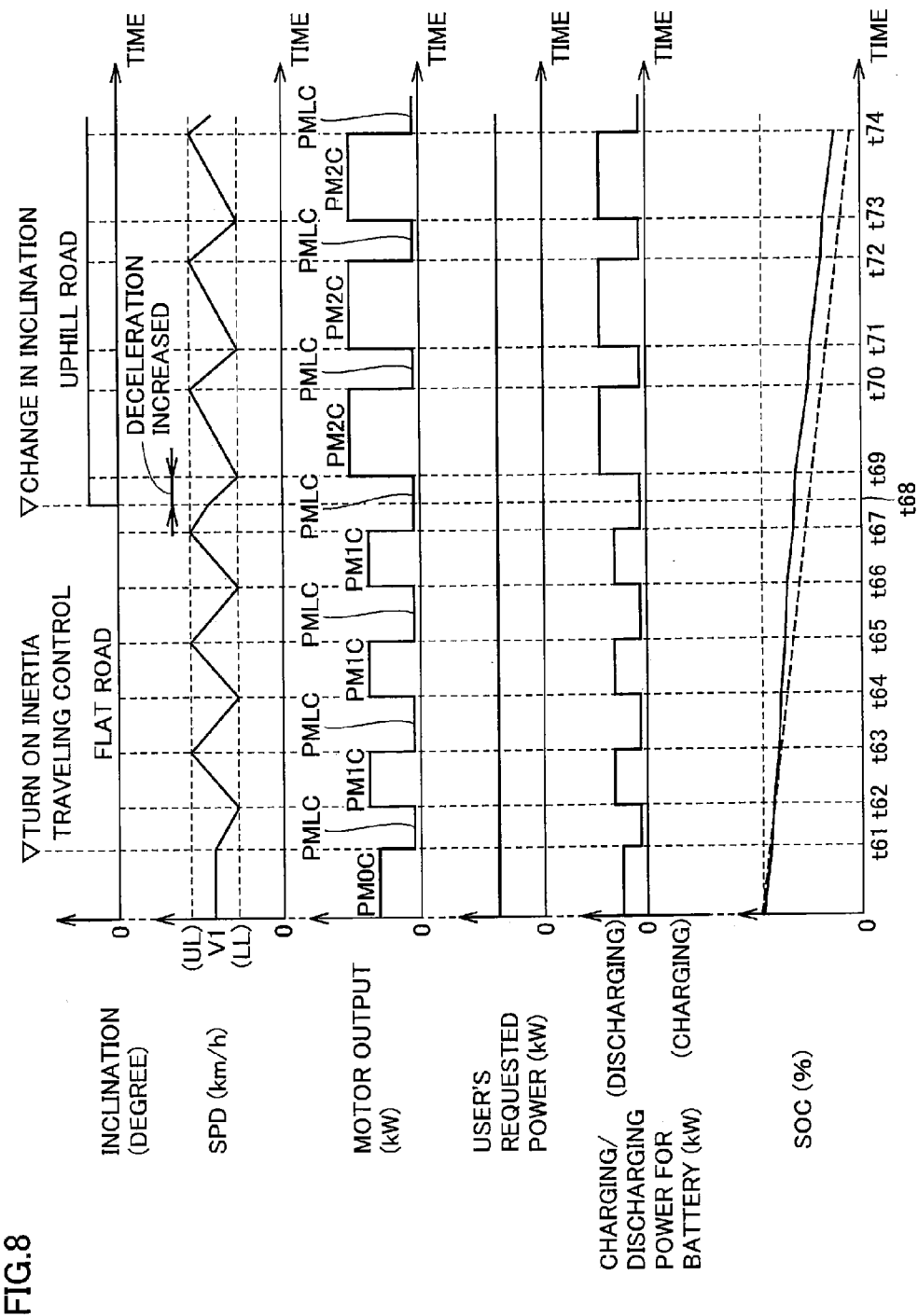
FIG. 8 is a time chart for illustrating another exemplary inertia traveling control.

It should be also noted that in each of the above-described first to third embodiments, the motor generator is stopped during the inertia traveling (inertia traveling on flat road in the third embodiment). However, for example, in order to improve driveability by easing deceleration during the inertia traveling, the motor generator may be driven to output low driving power during the inertia traveling as shown in the time chart of FIG. 8 instead of stopping the motor generator. In this case, as shown in FIG. 8, driving power PMLC of the motor generator for the traveling on flat road and driving power PMLC of the motor generator for the traveling on uphill may be adapted to be the same. However, as in the third embodiment, the driving power for the traveling on uphill may further include driving power corresponding to the influence of gravity.

[Fourth Embodiment]

In each of the first to third embodiments, the electric vehicle employing the motor generator as the driving source has been illustrated. However, the above-described driving power changing control can be applied to a vehicle having an engine as a driving source.

Figure 9:
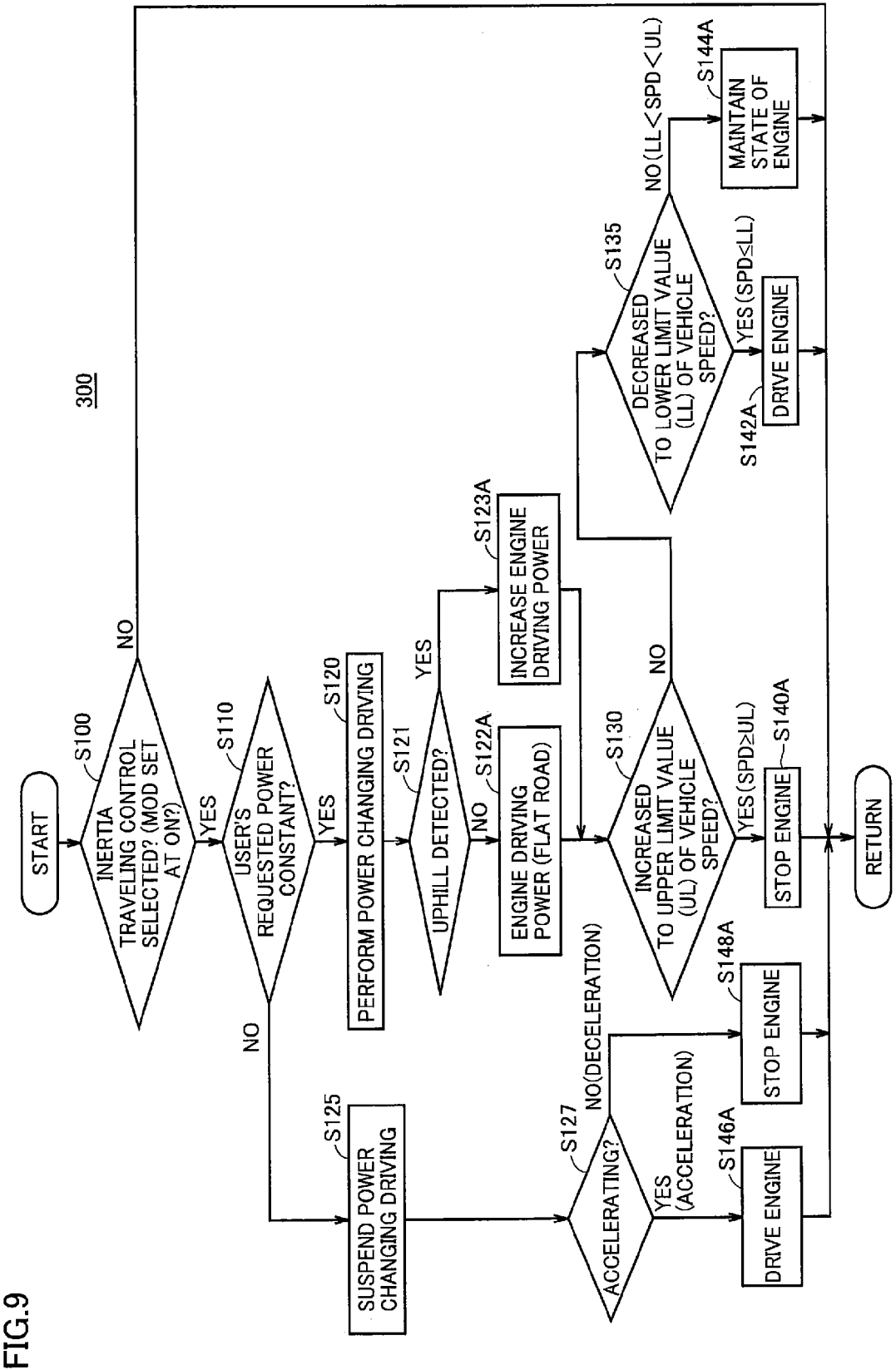
FIG. 9 is a flowchart for illustrating an inertia traveling control process performed by an ECU in a fourth embodiment in which an engine is employed as a driving source.

FIG. 9 is a flowchart for illustrating an inertia traveling control process performed by ECU 300 in the fourth embodiment in which the engine is provided as the driving source. FIG. 9 is a figure in which steps S122, S123, S140, S142, S144, S146, and S148 in the flowchart in FIG. 3 of the first embodiment are respectively replaced with S122A, S123A, S140A, S142A, S144A, S146A, and S148A. Processes in the steps thus replacing therewith are different only in that the driving power is output by the engine instead of the motor generator. Apart from this, the processes are the same as those in FIG. 3. For this reason, details of the processes will not be described repeatedly. Briefly, the engine is driven to perform the acceleration traveling in the case where the inertia traveling control is selected, where the user's requested power is constant, and where the vehicle speed is decreased to the lower limit value. Then, when the vehicle speed is increased to the upper limit value, the engine is stopped to perform the inertia traveling. Further, when detecting an uphill, the engine output in the acceleration traveling is set to be larger than that for flat road.

Thus, by applying the inertia traveling control to the vehicle employing the engine as the driving source and by increasing the engine output when traveling on the uphill, fuel consumption can be improved and the vehicle speed can be prevented from being decreased on the uphill.

It should be noted that configurations similar to the configurations of the second embodiment and the third embodiment can be applied also to the fourth embodiment in which the driving source is the engine.

Further, as illustrated in FIG. 8, a low output state such as an idling state may be employed without stopping the engine during the inertia traveling, for example. In the case where the driving source is the engine, cranking of the engine is required when starting the engine. Hence, if the engine is stopped whenever the inertia traveling is performed, energy efficiency may become worse due to energy required for the starting. Hence, control such as the one in FIG. 8 can be more advantageous in the inertia traveling in the case where energy consumed to continue driving of the engine is lower than energy consumed to start the engine.

[Fifth Embodiment]

Described in each of the first to fourth embodiments is the inertia traveling control performed in the case where a single motor generator or engine is provided as the driving source.

In the fifth embodiment, the following describes a case where the inertia traveling control is applied to a vehicle that travels using driving power supplied from a plurality of driving sources.

Figure 10:
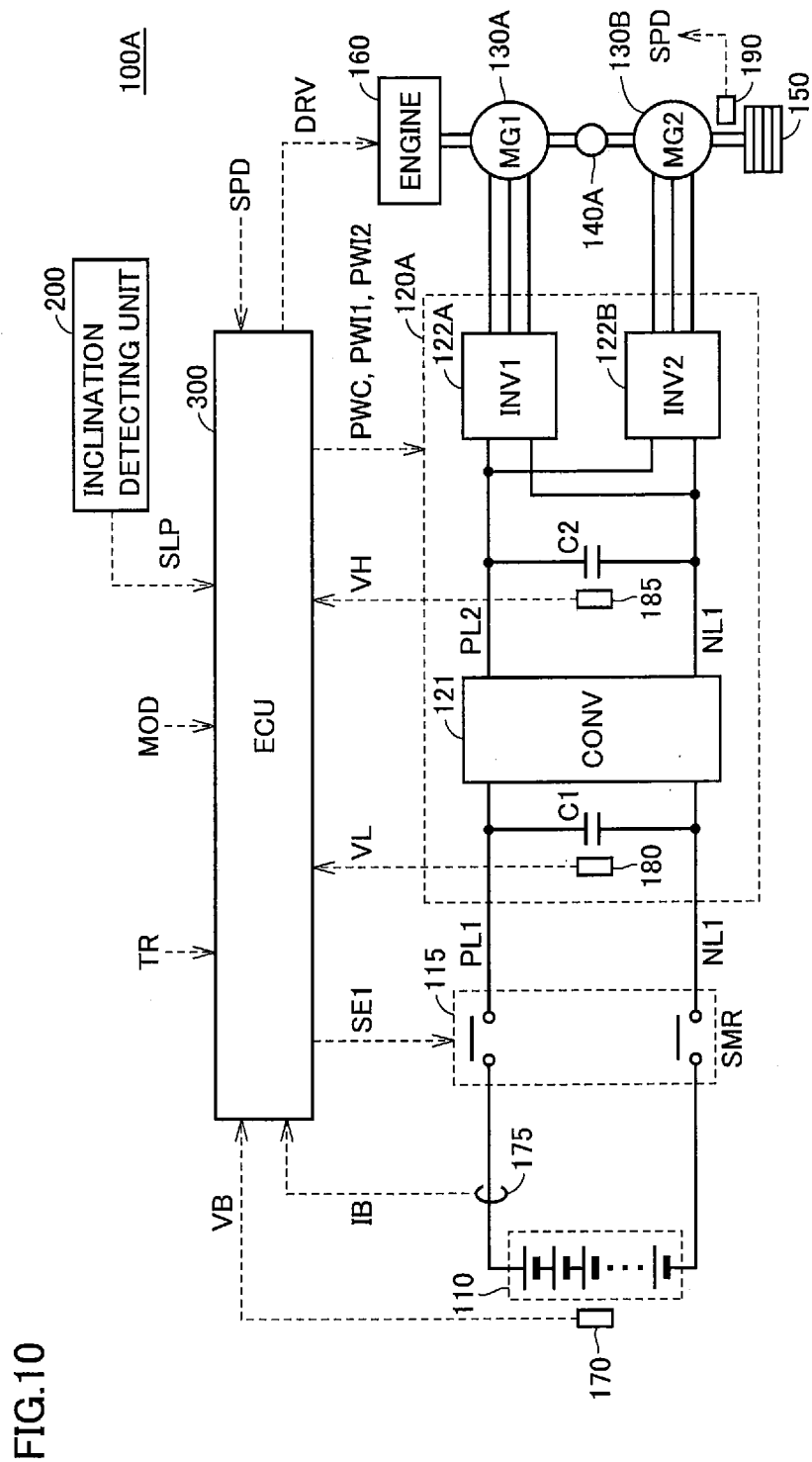
FIG. 10 is an overall block diagram of a hybrid vehicle according to a fifth embodiment.

FIG. 10 is an overall block diagram of a vehicle 100A according to the fifth embodiment. Vehicle 100A is a hybrid vehicle employing rotating electrical machines and an engine, which is an internal combustion engine, as the driving sources.

In FIG. 10, PCU 120 in FIG. 1 is replaced with a PCU 120A, motor generators 130A, 130B and an engine 160 are provided as the driving sources instead of motor generator 130. In FIG. 10, the same components as those in FIG. 1 are not described repeatedly.

Referring to FIG. 10, PCU 120A includes a converter 121, inverters 122A, 122B, capacitors C1, C2, and voltage sensors 180, 185.

Inverters 122A, 122B are connected to converter 121 in parallel via power lines PL2, NL1.

Inverter 122A is controlled in accordance with a control signal PWI1 from ECU 300, and converts direct-current power supplied from converter 121 into alternating-current power so as to drive motor generator 130A (hereinafter, also referred to as "MG1"). Further, inverter 122A converts alternating-current power generated by motor generator 130A into direct-current power so as to charge power storage device 110 via converter 121.

Inverter 122B is controlled in accordance with a control signal PWI2 from ECU 300, and converts direct-current power supplied from converter 121 into alternating-current power so as to drive motor generator 130B (hereinafter, also referred to as "MG2"). Further, inverter 122B converts alternating-current power generated by motor generator 130B into direct-current power so as to charge power storage device 110 via converter 121.

Each of output shafts of motor generators 130A, 130B is coupled to a power transmission gear 140A configured to include a power split device such as a planetary gear, for example. Then, driving power from motor generators 130A, 130B is transmitted to driving wheels 150.

Further, motor generators 130A, 130B are also coupled to engine 160 via power transmission gear 140A. Engine 160 is controlled in accordance with a control signal DRV sent from ECU 300. Driving power generated by engine 160 is transmitted to driving wheels 150 and motor generator 130A via power transmission gear 140A. ECU 300 cooperatively controls driving powers generated by motor generators 130A, 130B, and engine 160, thereby traveling the vehicle.

It should be noted that in the fifth embodiment, motor generator 130A is used as a starter motor for starting engine 160, and is exclusively used as a power generator driven by engine 160 to generate electric power. Further, motor generator 130B is exclusively used as a motor to drive driving wheels 150 using electric power supplied from power storage device 110.

Further, FIG. 10 shows an exemplary configuration including two motor generators and one engine, but the number of the motor generators is not limited to this. For example, one motor generator may be provided. Alternatively, more than two motor generators may be provided.

Figure 11:
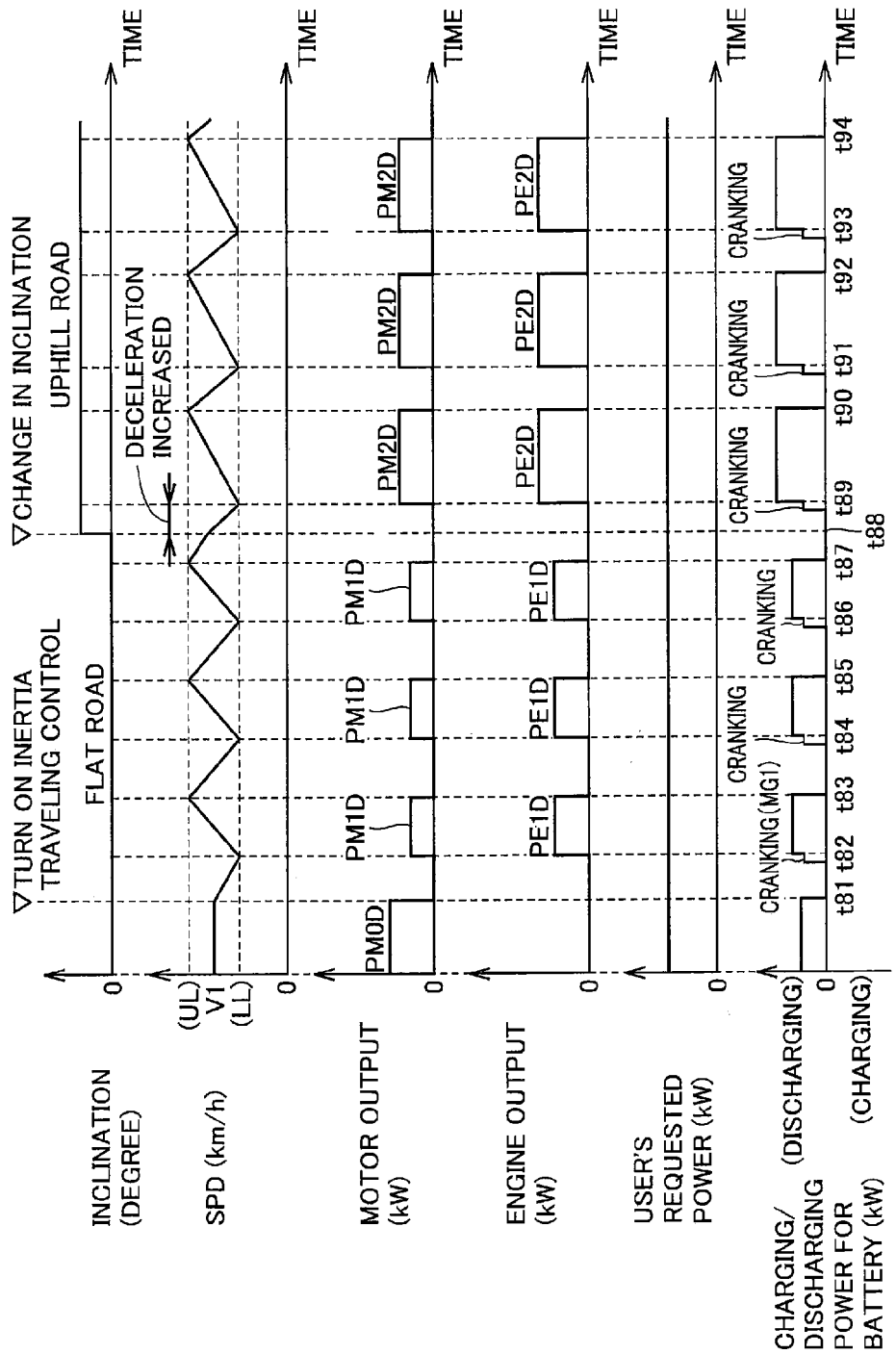
FIG. 11 is a time chart for illustrating gist of the inertia traveling control in the fifth embodiment.
Figure 12:
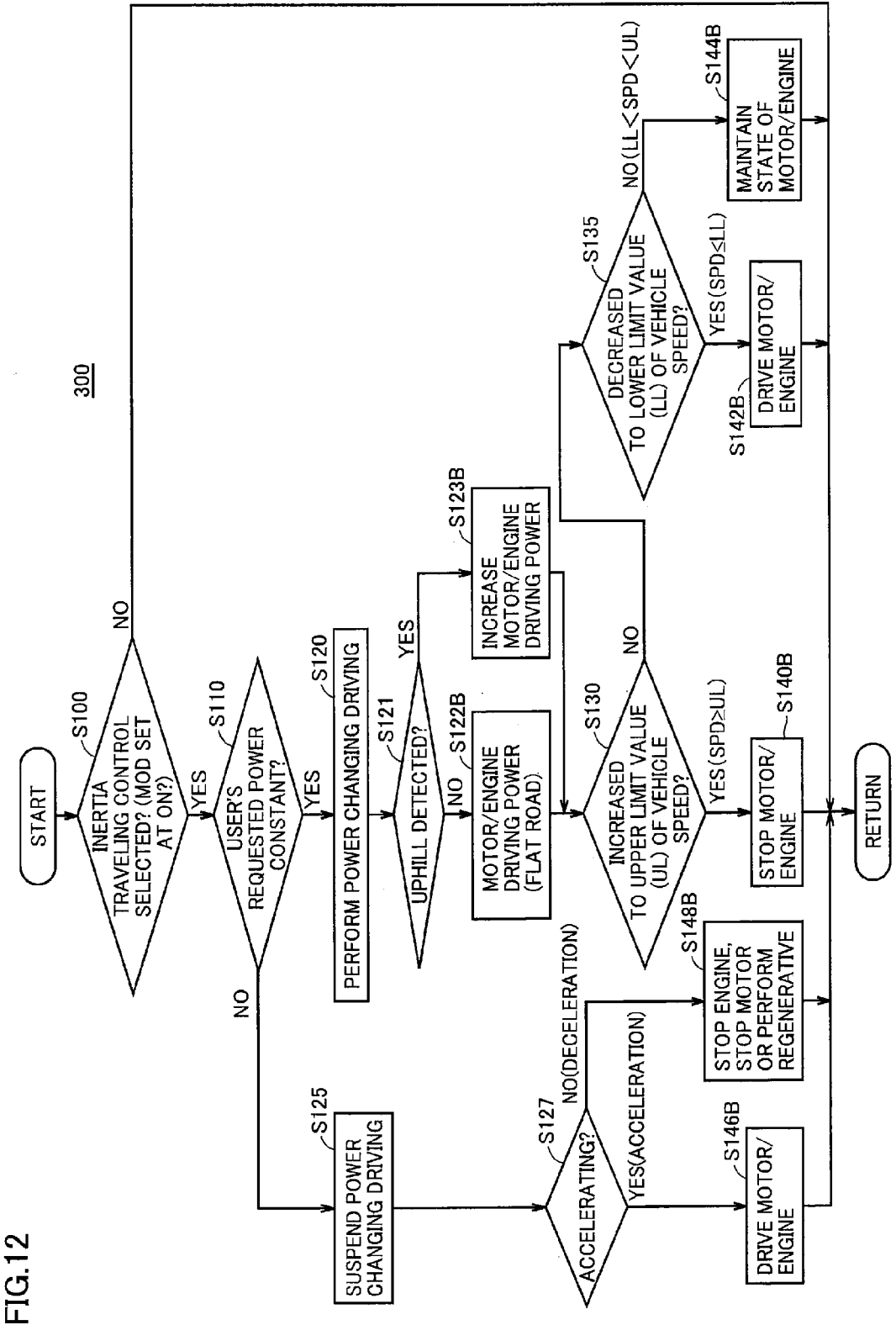
FIG. 12 is a flowchart for illustrating an inertia traveling control process performed by an ECU in the fifth embodiment.

Referring to FIG. 11 and FIG. 12, the following describes the inertia traveling control in the fifth embodiment. FIG. 11 is a time chart for illustrating gist of the inertia traveling control in the fifth embodiment. The horizontal axis represents time. The vertical axis represents inclination of a road surface, vehicle speed SPD, output of the motor generator (MG2), output of the engine, the user's requested power, and charging/discharging power for the power storage device.

Referring to FIG. 11, in the fifth embodiment, driving power for the acceleration traveling in the inertia traveling control is generated using driving power supplied from motor generator 130B and driving power supplied from engine 160. Specifically, in FIG. 11, during a period of time t81 to t88 in which the vehicle travels on a flat road, a total of driving power PM1D supplied from motor generator 130B and driving power PE1D supplied from engine 160 is set to be larger than driving power PM0D required to maintain the vehicle speed. Meanwhile, after time t88 in which the vehicle travels on an uphill, a total of driving power PM2D supplied from motor generator 130B and driving power PE2D supplied from engine 160 is set to be larger than the total driving power for the traveling on flat road.

It should be noted that a ratio of the driving power supplied from motor generator 130B and the driving power supplied from engine 160 in the acceleration traveling is appropriately set in consideration of energy efficiency of motor generator 130B and engine 160 so as to attain high energy efficiency in total.

Further, in FIG. 11, engine 160 is started whenever the acceleration traveling is performed. Hence, engine 160 is cranked by motor generator 130A (MG1) just before performing the acceleration traveling.

FIG. 12 is a flowchart for illustrating an inertia traveling control process performed by ECU 300 in the fifth embodiment. FIG. 12 is a figure in which steps S122, S123, S140, S142, S144, S146, and S148 in the flowchart of FIG. 3 of the first embodiment are respectively replaced with S122B, S123B, S140B, S142B, S144B, S146B, and S148B. In FIG. 12, the same steps as those in FIG. 3 are not described repeatedly.

Referring to FIG. 10 and FIG. 12, S122B, S123B, S140B, S142B, S144B, S146B, and S148B in FIG. 12 are respectively obtained by adding driving conditions for engine 160 in addition to motor generator 130B (MG2) to S122, S123, S140, S142, S144, S146, and S148 of FIG. 3.

When the user's requested power is constant (YES in S110) and the power changing driving is performed (S120), ECU 300 sets the driving power of each of motor generator 130B and engine 160 in the acceleration traveling, in accordance with whether or not the road surface is an uphill. Specifically, when the road surface is not the uphill (NO in S121), ECU 300 selects the driving power for flat road (S122B). When the road surface is the uphill (YES in S121), driving power of each of motor generator 130B and engine 160 is set in consideration of the influence of gravity so as to be larger than the driving power for flat road.

When vehicle speed SPD is decreased to lower limit value LL (YES in S135), ECU 300 drives MG2 and engine 160 using the driving power set in S122B or S123B, thereby performing the acceleration traveling (S142B).

Then, when vehicle speed SPD is increased to upper limit value UL (YES in S130), ECU 300 stops MG2 and engine 160, thereby performing the inertia traveling (S140B).

Further, when the user's requested power is fluctuated (NO in S110), the power changing driving is suspended (S125), and the vehicle is accelerating (YES in S127), ECU 300 accelerates using MG2 or using MG2 and engine 160 (S146B). Meanwhile, when the vehicle is decelerating (NO in S127), ECU 300 stops engine 160, and stops MG2 or switches MG2 to a low output state, so as to decelerate (S148B). It should be noted that for the deceleration, regenerative operation of MG2 may be performed.

By performing the control in accordance with the above-described process, the inertia traveling control taking the uphill into consideration can be performed to improve energy efficiency in the hybrid vehicle employing the engine and the motor generators as the driving sources.

It should be noted that the description above has illustrated the case where both the driving power of MG2 for uphill and the driving power of engine 160 for uphill are made larger than those for flat road, but one of the driving power of MG2 and the driving power of engine 160 may be made larger in consideration of energy efficiency of MG2 and engine 160, responsiveness of the driving power, and the like. Further, in a specific case or a specific timing, the total driving power may be output from one of MG2 and engine 160.

Further, as illustrated in FIG. 8, one of MG2 and engine 160 or both of MG2 and engine 160 may be driven to output low driving power during the inertia traveling.

Further, the configuration(s) of the second embodiment and/or the third embodiment can be applied to the fifth embodiment.

[Sixth Embodiment]

In the fifth embodiment, the hybrid vehicle including the engine and the motor generators as the plurality of driving sources has been described and illustrated. However, the present invention can be applied to a vehicle having a different configuration, such as an electric vehicle having a twin motor configuration and capable of traveling using driving power from each of two motor generators serving as a plurality of driving sources as shown in FIG. 13, for example.

Figure 13:
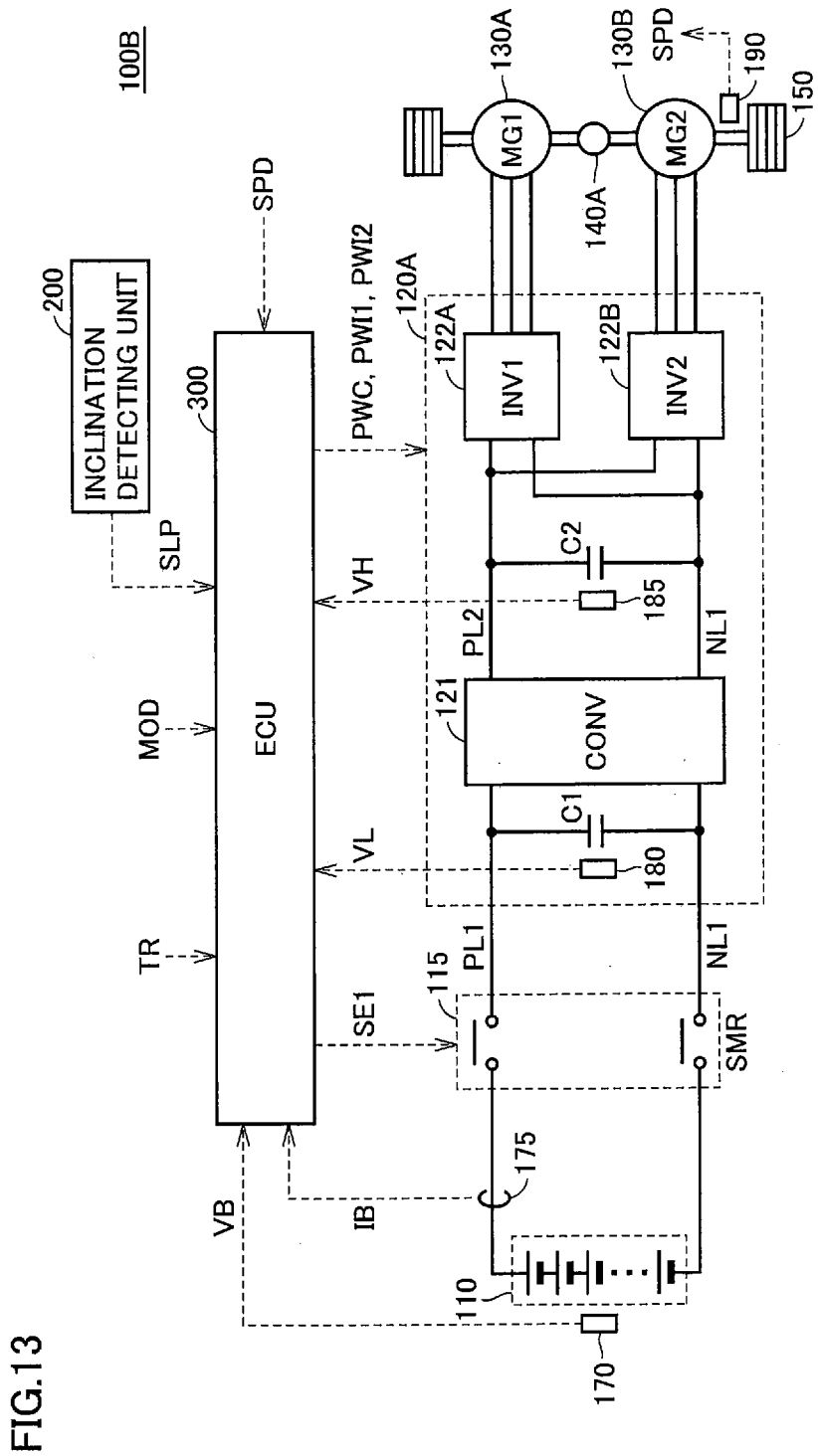
FIG. 13 is an overall block diagram of a vehicle according to a sixth embodiment in which two motor generators are employed as driving sources.

Vehicle 100B of FIG. 13 has a configuration in which no engine 160 is provided in vehicle 100A of FIG. 10. Vehicle 100B travels using both driving power of motor generator 130A (MG1) and driving power of motor generator 130B (MG2).

In this case, unlike in the fifth embodiment, power storage device 110 cannot be charged using motor generator 130A (MG1). However, by replacing the driving power of engine 160 in FIG. 11 of the fifth embodiment with the driving power of MG1, the power changing driving can be performed.

Further, in the configuration of FIG. 10 of the fifth embodiment, the present invention is applicable also in the case where MG1 is also used as a motor rather than a power generator and traveling is performed using driving power generated by the three driving sources, i.e., MG1, MG2, and engine 160.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

Reference Signs List

100, 100A, 100B: vehicle; 110: power storage device; 115: SMR; 120: PCU; 121: converter; 122, 122A, 122B: inverter; 130, 130A, 130B: motor generator; 140, 140A: power transmission gear; 150: driving wheel; 160: engine; 170, 180, 185: voltage sensor; 175: current sensor; 190: speed sensor; 200: inclination detecting unit; 300: ECU; C1, C2: capacitor; PL1, PL2, NL1: power line.

The invention claimed is:

1. A vehicle comprising:
  a driving source for generating driving power for traveling of the vehicle;
  a control device for controlling said driving source; and
  an inclination detecting unit for detecting inclination of a road surface,
  said control device performing power changing driving in which the vehicle is traveled while switching said driving source between a first state and a second state, said control device setting driving power of a first level being generated said driving source in said first state to be a first level, said control device setting driving power of said driving source in said second state to be smaller than the first level in said first state,
  when it is recognized that the vehicle is traveling on an uphill road based on the inclination detected by said inclination detecting unit, said control device setting the driving power in said first state to be larger than driving power set when the vehicle is traveling on a flat road,
  when said power changing driving is being performed, said control device switching to said first state in response to speed of the vehicle being decreased to a lower limit value of a permitted range, and switching to said second state in response to speed of the vehicle being increased to an upper limit value of said permitted range,
  when the vehicle is traveling on the uphill road, said control device setting said upper limit value to be lower than an upper limit value set when the vehicle is traveling on the flat road.

2. The vehicle according to claim 1, wherein said control device performs said power changing driving when a change of user's requested driving power falls within a predetermined range.

3. The vehicle according to claim 1, wherein when said power changing driving is being performed, said control device switches between said first and second states to maintain speed of the vehicle in the permitted range.

4. The vehicle according to claim 1, wherein when the vehicle is traveling on the uphill road, said control device sets the driving power in said second state to be larger than that set when the vehicle is traveling on the flat road.

5. The vehicle according to claim 1, wherein said control device sets the driving power in said first state to be larger as a degree of said inclination is larger in a direction of traveling on the uphill road.

6. The vehicle according to claim 1, wherein
  the driving power in said first state is set to be larger than a constant reference driving power that is capable of maintaining speed of the vehicle, and
  the driving power in said second state is set to be smaller than said constant reference driving power.

7. The vehicle according to claim 6, wherein in said second state, said control device stops generation of the driving power from said driving source.

8. The vehicle according to claim 6, wherein in said second state, the vehicle travels mainly using inertia force of the vehicle.

9. The vehicle according to claim 1 further comprising another driving source for generating driving power for traveling of the vehicle, wherein
said control device performs power changing driving in which said another driving source is switched between a third state and a fourth state, said control device setting driving power of said another power source to be a second level in said third state, said control device setting driving power of said another power source in said fourth state to be smaller than the second level in said third state.

10. The vehicle according to claim 9, wherein when said driving source is in said first state, said control device brings said another driving source into said third state, and when said driving source is in said second state, said control device brings said another driving source into said fourth state.

11. The vehicle according to claim 9, wherein when the vehicle is traveling on the uphill road, said control device sets driving power of said another driving source in said third state to be larger than driving power of said another driving source set when the vehicle is traveling on the flat road.

12. The vehicle according to claim 9, wherein
a total of driving power of said driving source in said first state and driving power of said another driving source in said third state is set to be larger than a constant reference driving power that is capable of maintaining speed of the vehicle, and
a total of driving power of said driving source in said second state and driving power of said another driving source in said fourth state is set to be smaller than said constant reference driving power.

13. The vehicle according to claim 9, wherein
one of said driving source and said another driving source is a rotating electrical machine, and
the other of said driving source and said another driving source is an engine.

14. The vehicle according to claim 9, wherein both said driving source and said another driving source are rotating electrical machines.

15. The vehicle according to claim 1, wherein said driving source is one of a rotating electrical machine and an engine.

16. A method for controlling a vehicle having a driving source for generating driving power for traveling thereof and an inclination detecting unit for detecting inclination of a road surface, comprising the steps of:
bringing said driving source into a first state in which driving power of a predetermined level is generated;
bringing said driving source into a second state in which driving power is made smaller than the predetermined level in said first state;
performing power changing driving in which the vehicle is traveled while switching between said first and second states;
when it is recognized that the vehicle is traveling on an uphill road based on the inclination detected by said inclination detecting unit, setting driving power in said first state to be larger than driving power set when the vehicle is traveling on a flat road;
when said power changing driving is being performed, switching to said first state in response to speed of the vehicle being decreased to a lower limit value of a permitted range, and switching to said second state in response to speed of the vehicle being increased to an upper limit value of said permitted range; and
when the vehicle is traveling on the uphill road, setting said upper limit value to be lower than an upper limit value set when the vehicle is traveling on the flat road.

* * * * *